United States Patent
Schnizlein et al.

[19]

[11] Patent Number: 6,075,831
[45] Date of Patent: *Jun. 13, 2000

[54] FIFO AND SYSTEM SYNCHRONIZATION SYSTEM AND METHOD

[75] Inventors: Paul Schnizlein; Alan Hendrickson, both of Austin, Tex.

[73] Assignee: Advanced Micro Devices, Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/923,321

[22] Filed: Sep. 4, 1997

Related U.S. Application Data

[63] Continuation of application No. 08/581,268, Dec. 29, 1995, abandoned.

[51] Int. Cl.[7] .................................................. H04K 1/02
[52] U.S. Cl. ......................... 375/359; 375/355; 375/360; 375/363; 375/370; 375/372; 375/376; 370/511; 379/60; 379/61
[58] Field of Search ............................... 365/221; 377/28, 377/33; 380/48; 370/195.1, 20.1; 379/61; 375/359, 355, 360, 363, 365, 370, 372, 376

[56] References Cited

U.S. PATENT DOCUMENTS

| | | | |
|---|---|---|---|
| 4,682,350 | 7/1987 | Akerberg | 379/61 |
| 4,803,726 | 2/1989 | Levine et al. | 380/48 |
| 5,416,779 | 5/1995 | Barnes et al. | 370/29.1 |
| 5,533,027 | 7/1996 | Akerberg et al. | 370/195.1 |
| 5,666,366 | 9/1997 | Malek et al. | 370/505 |

FOREIGN PATENT DOCUMENTS 7-154321  6/1995  Japan .

*Primary Examiner*—Viet Q. Nguyen

[57] ABSTRACT

A method for handling underflow and overflow of data in a FIFO buffer includes steps of inserting an insert data word in the FIFO buffer if there is an underflow of data at the FIFO buffer and discarding a discard data word of the FIFO buffer if there is an overflow of data at the FIFO buffer. In one embodiment, the insert data word is null and does not change the status of the FIFO buffer.

21 Claims, 3 Drawing Sheets

FIFO AND SYSTEM SYNCHRONIZATION SYSTEM AND METHOD

RELATED PATENT DOCUMENT

This application is a continuation of U.S. Patent Ser. No. 08/581,268 filed on Dec. 29, 1995, now abandoned.

All of the related applications are assigned to the assignee of the present invention and are hereby incorporated herein in their entirety by this reference thereto.

BACKGROUND OF THE INVENTION

The invention relates to first-in-first-out (FIFO) buffers and, more particularly, relates to systems and methods for handling underflow and overflow in a FIFO buffer of a digital cordless telephone handset unit or base set unit.

Digital cordless telephones typically consist of two separate units, a base set unit that generally remains at a particular location and a handset unit that is portable in relation to the base set unit. In operation of such a digital cordless telephone, the base set unit and handset unit communicate by radio frequency various protocols and data signals between the units. Typically, the base set unit and the handset unit are synchronized by making one unit, often the handset unit, a timing slave to the other unit, the base set unit in that instance, the master timer. Although one unit is a timing slave to the other unit, each unit may have its own internal clock, for example, derived from a crystal of the respective unit.

In the related applications cross-referenced above and in other related digital cordless telephone designs, the slave unit acts as a slave to the other master unit in normal operation, however, upon a fade of radio frequency signals communicated by the units, each unit commences operations during the fade according to its own internal clock.

The results of such operations during the fade is that the slave unit, upon losing the timing signal from the master unit, commences operation during the fade via the internal clock of the slave unit. The internal clock will, in that instance, have a relationship with the timing of the master that is different than the relationship prior to the fade. This presents a problem to system synchronization because mechanisms for synchronizing the slave unit timing to that of the master unit requires some timing signal from the master unit in order to achieve the synchronization. That problem is evident, for example, when master and slave timing relationship of communicating units are disturbed to such extent that the normal synchronization scheme of master and slave cannot maintain appropriate synchronization.

An example of such an instance of disturbed master and slave timing relationship is the drift of master and slave timing due to signal fades. As signal fades occur and timing signal communications are momentarily lost during the fades, drift may occur between one unit's timing and that of the other unit. As the drift grows because of recurring fades, the drift may present a situation in which the drift offset is so large that it involves a complete cycle of timing of a unit. When that occurs, communicated data between the units may be lost, resulting in invalid or otherwise inappropriate communications between units.

Embodiments of the present invention provide systems and methods for accounting in communications between communications units for drift of master and slave timing that results in loss of complete timing cycles. The present invention is clearly a significant improvement in the art and technology.

SUMMARY OF THE INVENTION

An embodiment of the invention is a method for handling underflow and overflow of data in a FIFO buffer. The method comprises the steps of inserting an insert data word if there is an underflow of data at the FIFO buffer and discarding a discard data word of the FIFO buffer if there is an overflow of data at the FIFO buffer. The insert data word may be null and have no effect on the status of the FIFO buffer.

DESCRIPTION OF THE PREFERRED EMBODIMENTS

Figure 1:
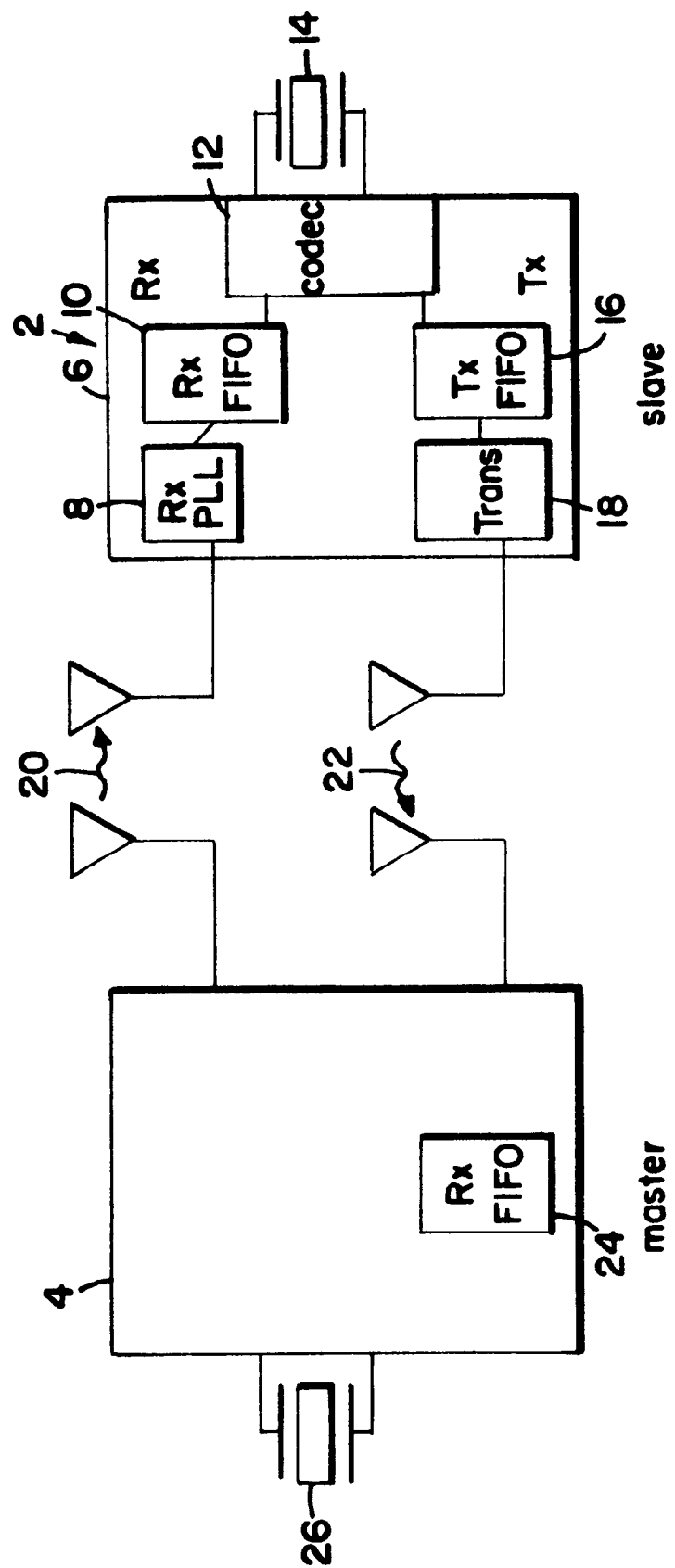
FIG. 1 is a simplified illustration of two units of a communications system, such as a digital cordless telephone, wherein one of the units, for example, the base set unit, serves as a master for timing of the system and the other unit, for example, the handset unit, serves as a timing slave to the master.

Referring to FIG. 1, a digital cordless telephone 2 comprises two communications units. For purposes of illustration only, one unit is a base set unit 4 and the other unit is a portable (handset) unit 6. Also for purposes of illustration, the system is synchronized by making the base set unit 4 behave as a master for timing and the handset unit 6 as a slave to the timing of the master. The designation of master and slave, as well as the designation of the units as base set unit 4 and handset unit 6, may be different in practice and the designation herein should be considered only as an example useful for illustration. In practice, the master and slave unit may be any communications units of a communications system and either of the units 4, 6 could be the master and the other the slave.

The handset unit 6 is seen to consist of basic communications elements, such as a receive signal phase lock loop 8 for locking onto a receive signal 20 to the handset unit 6 from the base set unit 4. The handset unit 6 also includes a receive FIFO buffer 10 for receiving the receive signal 20 detected by the phase lock loop 8. A codec 12 of the handset unit 6 makes data from the receive FIFO buffer 10 available for use by the handset unit 6. Data from the codec 12 may also be passed to a transmit FIFO buffer 16 of the handset unit 6 and on to a transmitter 18 of the handset unit 6. The transmitter 18 may transmit signals from the handset unit 6 to the base set unit 4. The base set unit 4 may include corresponding components to the handset unit 6, or other similar components that enable communications between the units 4, 6.

It is of note that each of the base set unit 4 and the handset unit 6 has its own internal crystal, crystal 26 and crystal 14, respectively. The respective crystals 14, 26 of the units 6, 4 provide internal timing for operations of the units 6, 4. In order to achieve synchronization for communications between the base set unit 4 and handset unit 6, however, the handset unit 6 is slaved to the timing of the base set unit 4. This is accomplished through communications of timing signals by the base set unit 4 to the handset unit 6, as received signal 20. In the synchronization arrangement, the transmit timing of the handset unit 6 may be derived from the receive signal 20 in such a manner that the transmit timing for transmit signal 22 is also a slave of the timing of the base set unit 4.

Figure 2:
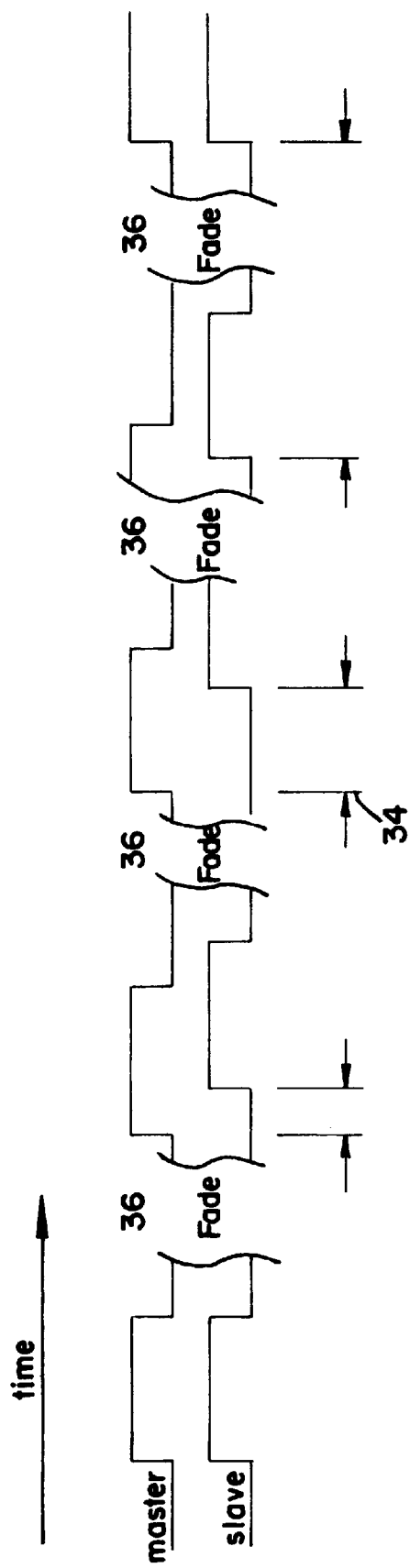
FIG. 2 is an illustration of waveforms of timing of the master and slave units of FIG. 1, showing intermittent fades and resulting offset due to drift of one waveform in relation to the other.

Referring to FIG. 2, an illustrative master timing waveform 30 and slave timing waveform 32 are shown. It is notable that over time various fades 36 may interrupt the waveforms 30, 32. When so interrupted, the base set unit 4 and handset unit 6 each revert to operation in accordance with the internal timing of the unit 4, 6 derived from the applicable system crystal 26, 14. As fades 36 occur, the synchronization of timing between the base set unit 4, as master, and the handset unit 6, as slave, drifts. These drifts result in offsets 34 of the master timing waveform 30 and slave timing waveform 32. Over time, the drift may be so great that the offset 34 of master timing waveform 30 or slave timing waveform 32 is at least as great as a complete cycle of one of the waveforms 30, 32.

For purposes of example, the slave timing waveform 32 is illustrated in FIG. 2 as being slower than the master timing waveform 30. Being slower, the offset 34 may increase such that the master timing waveform 30 completes a cycle that has not been initiated by the slave timing waveform 32. In that instance, the missed cycle of the slave unit, the handset unit 6 in the example, will, therefore, never occur. As those skilled in the art will readily appreciate and understand, the reverse situation could be true as well, depending upon which of the master unit or the slave unit has a faster internal clock from its respective crystal 14, 26.

In any event, loss of a timing cycle by either of the master or slave unit results in the underflow or overflow of data in the respective unit 4, 6. Continuing to discuss the handset unit 6 and base set unit 4 of the example and the particular master and slave designations given according to that example, an underflow of receive data at the handset unit 6 results in the codec 12 attempting to handle data that is not available at the receive FIFO buffer 10 of the handset unit 6. Alternatively, an overflow situation of the receive FIFO buffer 10 may occur if the timing of the handset unit 6 is slow compared to the base set unit 4. In that instance of overflow, then the base set unit 4 as master will have its receive FIFO buffer 24 underflowing because the handset unit 6 is slow and has not transmitted 22 as much as the base set unit 4 expected.

Figure 3:
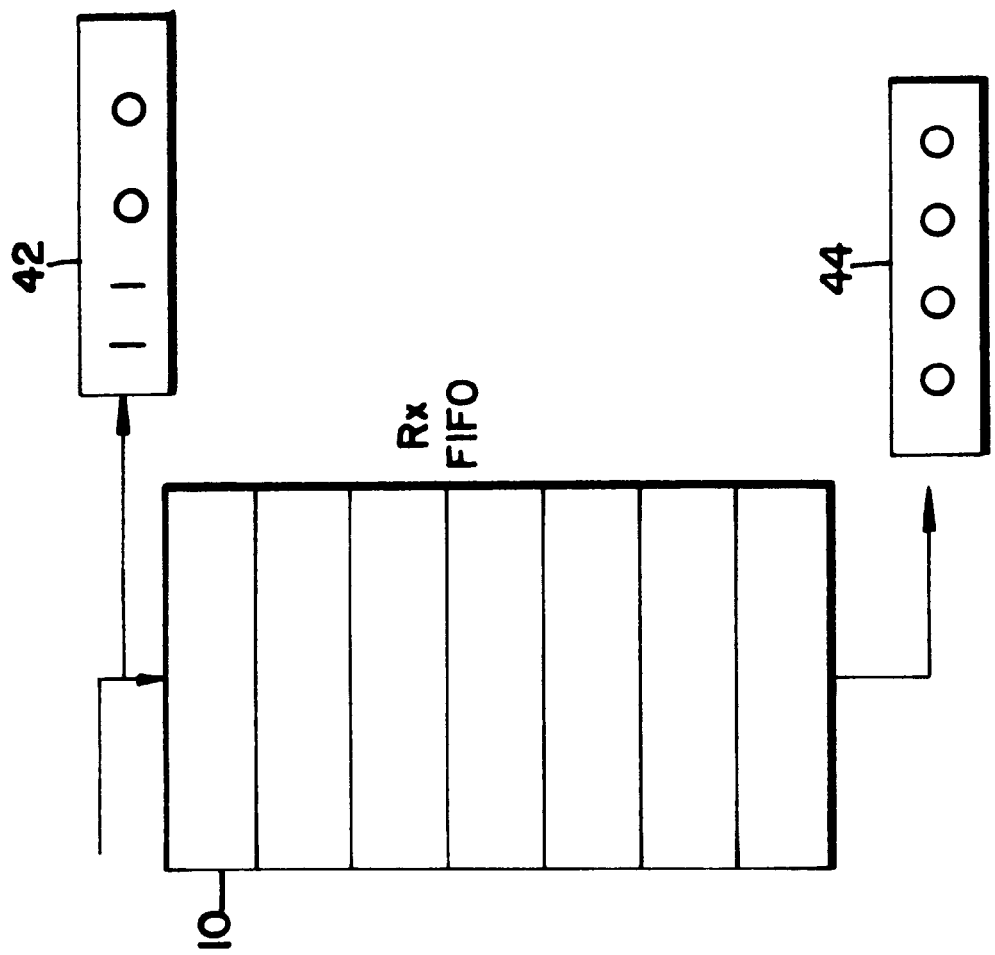
FIG. 3 is an illustration of FIFO operation, according to embodiments of the present invention, in the event of an overflow or underflow resulting from offset between master and slave timing of a complete frame.

Referring now to FIG. 3, receive FIFO buffer 10 operation in the event of underflow or overflow at the handset unit 6, according to embodiments of the invention, may be described. In the illustrated embodiment, the transmit FIFO buffer 16 of the handset unit 6 is maintained without underflow or overflow that would result in loss of communicated data. This is accomplished by inserting an insert data word 44 the output of the FIFO buffer 10 if there is an underflow at the receive FIFO buffer 10 or discarding a discard data word 42 from the input of the FIFO buffer 10 if there is an overflow at the receive FIFO buffer 10.

According to embodiments of the invention, when an insert data word 44 is inserted because of underflow, that word 44 consists solely of zeros. Such an insert data word 44 is considered a null by the handset unit 6 circuitry and does not invoke particular operations of the handset unit 6 in response. Thus, no change in the state of the handset unit 6 results from such a null insert data word 44.

In the case of overflow of the receive FIFO buffer 10, a discard data word 42 is discarded to prevent overflow. Although the discarding of the discard data word 42 results in loss of some data, that loss is minimal and of no significance when the data is communications data, such as voice information in the instance of the digital cordless telephone 2. In any event, the loss of the data of a single discard data word 42 from time to time is insignificant in comparison to the loss of a complete timing cycle which could otherwise result, as previously described. The loss of a timing cycle or gain of a timing cycle at the handset unit 6 does not impede operations according to the embodiments of the invention, and only the single null insert data word 44 is inserted or the discarded discard data word 42 is discarded, resulting in little or no disruption of receipt and transmission of communications data between the units 4, 6.

Although illustrative embodiments of the invention have been shown and described, a wide range of modification, change, and substitution is contemplated in the foregoing disclosure and, in some instances, some features of the present invention may be employed without a corresponding use of the other features. Accordingly, it is appropriate that the appended claims be construed broadly and in a manner consistent with the scope of the invention.

What is claimed is:

1. A method for providing data words for use within a digital cordless telephone, comprising the steps of:

receiving an input series of data words into an input of a buffer;

transmitting an output series of data words from an output of the buffer;

inserting an insert data word into the output series if there is an underflow of data at the buffer; and discarding a discard data word from the input series if there is an overflow of data at the buffer.

2. The method of claim 1, wherein the insert data word is null and does not change status of the buffer.

3. The method of claim 1, wherein the the insert data word is inserted at the output of the buffer.

4. The method of claim 1, wherein the insert data word is defined by a series of zeros.

5. The method of claim 1 wherein the buffer is a first-in-first-out (FIFO) buffer, and wherein the digital cordless telephone includes a codec in the handset to use the output series of data words.

6. The method of claim 5 wherein the FIFO buffer forms a portion of a digital cordless telephone handset unit.

7. The method of claim 5 wherein the FIFO buffer forms a portion of a digital cordless telephone base set unit.

8. A method for handling underflow of data in a buffer, within a digital cordless telephone, the telephone using a coding scheme having an invalid code word, comprising the steps of:

determining whether there is an underflow of data at the buffer; and upon a determination that there is an underflow, inserting an insert data word at an output of the buffer.

9. The method of claim 8, wherein the insert word is a null word.

10. The method of claim 8, wherein the telephone has a predetermined timing and the inserted data word allows the telephone to maintain the predetermined timing.

11. The method of claim 8 for also handling overflow of data in the buffer, comprising the steps of:

determining whether there is an overflow of data at the buffer; and upon a determination that there is an overflow, discarding a discard data word from an input of the buffer.

12. The method of claim 8 wherein the buffer is a first-in-first-out (FIFO) buffer.

13. The method of claim 12 wherein the FIFO buffer is a portion of a digital cordless telephone handset unit.

14. The method of claim 12 wherein the FIFO buffer is a portion of a digital cordless telephone base set unit.

15. A system for receiving a flow of data for use by a digital cordless telephone, the system comprising:

a buffer for receiving the flow of data and transmitting an output flow of data for use by the digital cordless telephone;

means for determining whether there is an overflow of the received flow of data at the buffer; and means, responsive to a determination that there is an overflow, for discarding a discard data word from the received flow of data at the buffer.

16. The system of claim 15, wherein the insert word is a null word.

17. The system of claim 15 further comprising:

means for determining whether there is an underflow of the output flow of data at the buffer; and means, upon a determination that there is an underflow for providing an insert data word in the output flow of data.

18. The system of claim 15 wherein the buffer is a first-in-first-out (FIFO) buffer.

19. The system of claim 18 wherein the FIFO buffer forms a portion of a handset unit of the digital cordless telephone.

20. The system of claim 18 wherein the FIFO buffer forms a portion of a base set unit of the digital cordless telephone.

21. A method for providing data words for use within a digital telephone, comprising the steps of:

receiving an input series of data words into a buffer;

transmitting an output series of data words from the buffer;

inserting an insert data word into the output series if there is an underflow of data at the buffer; and discarding a discard data word from the input series if there is an overflow of data at the buffer.

\* \* \* \* \*